Figure 1:
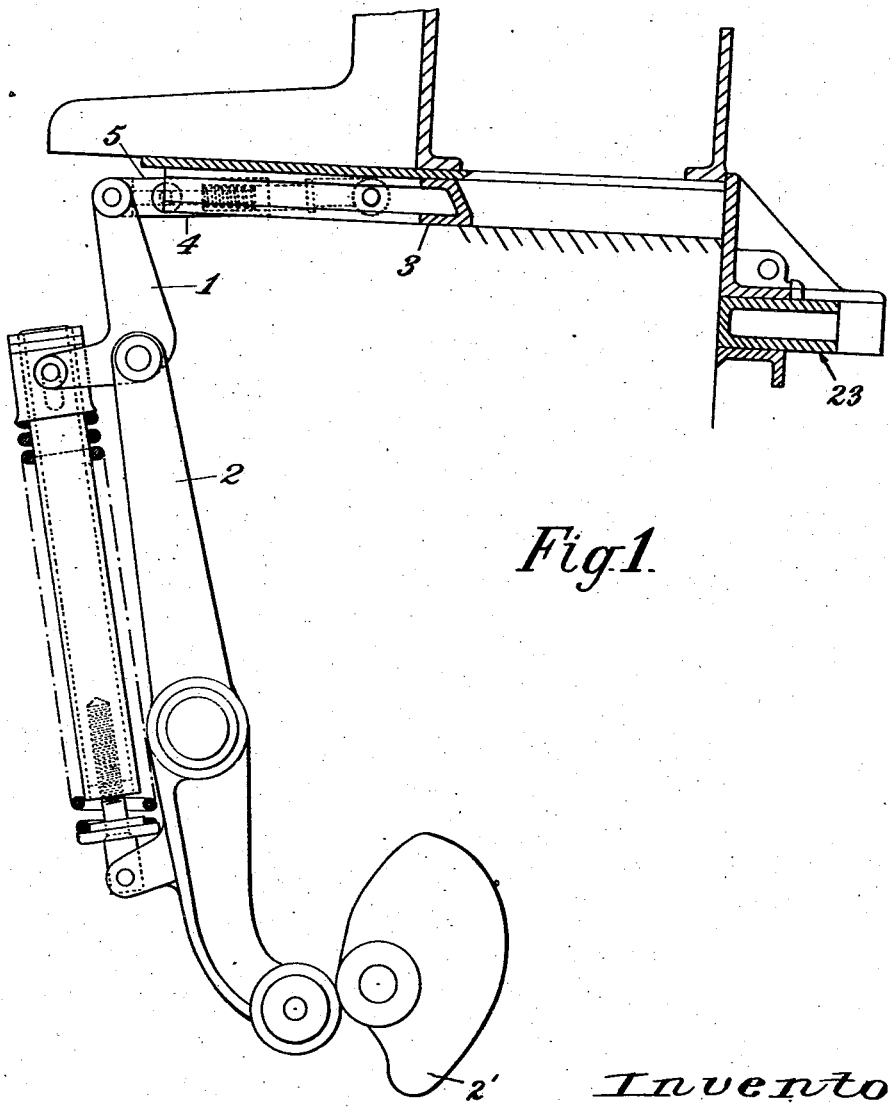

Oct. 1, 1946.  A. R. PALMER  2,408,679
DOUGH DIVIDING MACHINE
Filed June 12, 1944  2 Sheets-Sheet 2

Inventor
A. R. Palmer
By Glascock Downing Seebold
Attys.

Patented Oct. 1, 1946

2,408,679

UNITED STATES PATENT OFFICE 2,408,679

DOUGH DIVIDING MACHINE

Austin Richard Palmer, Peterborough, England, assignor to Baker Perkins Limited, Peterborough, England Application June 12, 1944, Serial No. 539,924
In Great Britain May 19, 1943

4 Claims. (Cl. 107—15)

This invention relates to dough dividing machines of the single or multi-pocket type wherein the ram means is reciprocated by cam or like action through lever means or other operative connections. In such machines when adapted for dividing one or other of two weights of dough pieces, the ram means makes the same length of stroke when delivering the dough for filling the pockets for one weight as for the other. For example, in a divider adapted to divide pieces of dough using either pockets for making dough pieces for a 2-lb. loaf or for a 1-lb. loaf, the dividing reciprocating stroke of the ram is the same in both cases.

An aim of the invention is to provide improvements calculated to reduce wear and strain on the mechanical parts of the machine and to reduce the pressure or felling action caused by the pocket filling stroke of the ram means to a minimum with a view to effecting a consequent improvement in the quality of the divided dough.

According to the invention means are provided which are adapted to afford differential ram strokes selectively employable according to the weight of the dough piece to be divided.

The invention also consists in a lost motion device and resilient or buffer means interposed between the ram and its operating cam or like power means and capable of being brought into operation when it is intended to divide dough pieces according to the lesser weights of dough for which the machine is designed, to impart a shorter cushioned dividing stroke to the ram than when the machine is set for dividing the weights of dough for the larger loaves.

In one form of the invention as applied to a divider in which the ram means is driven by a cam-actuated bell-crank or other lever through a connecting rod, the latter is formed in two parts capable of alternatively being set to operate as a solid rod between fixed centres for the larger weights of dough and freed for the smaller weights so that one part of the rod may slide relatively to the other to afford lost motion for a portion of the dividing stroke against the resilience of spring means until, towards the conclusion of the dividing stroke, an abutment is met which causes the parts of the rod to impart a solid thrust.

The selective or alternative operation may be effected or controlled by a manually operable locking device, catch, removable pin or the like adapted when in position or operation to lock the two parts together to constitute the solid form of rod and when removed or unfastened to free the parts for sliding relative movement.

Figure 2:
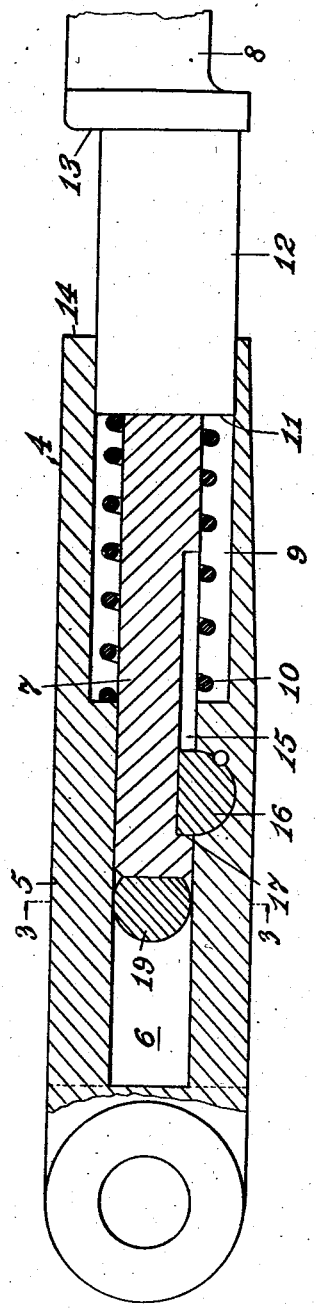
Figure 3:
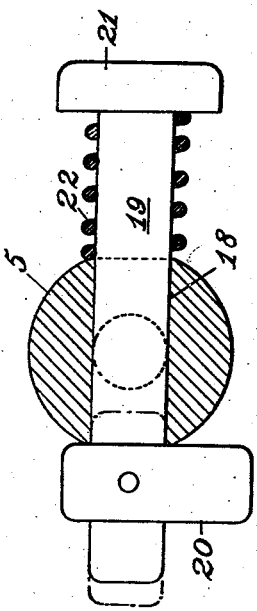

In the accompanying drawings:

Figure 1 is an elevation, partly in section, showing the main parts of a divider, with the improved two part connecting rod, Figure 2 is a longitudinal section of the connecting rod, and Figure 3 is a cross section at 3—3 of Figure 2 showing the coupling pin in position.

In carrying the invention into effect as described by way of example as applied to a dough dividing machine of the character described in British Patent No. 435,166 of which Messrs. Baker Perkins Limited are the registered proprietors the connecting rod uniting the auxiliary or bell-crank lever 1 carried by the main lever 2 operated by the cam 2' and the ram 3 is replaced by the improved connecting rod 4.

The improved connecting rod 4 is formed in two parts the rear part 5 having an axial bore 6 entering its forward end for receiving and guiding a rearwardly directed spindle 7 provided on the other or forward part 8 of the rod. This bore 6 is also provided with a counter bore 9 in which is housed a relatively light compression spring 10 which surrounds the spindle 7 and is seated against the bottom of the counter bore and against a shoulder 11 formed by an enlargement 12 on the spindle 7, the enlargement 12 being also adapted to slide and be guided in the counter bore 9. At its forward end, the enlargement 12 is provided with a shoulder or stop 13 adapted to function as an abutment for the forward end 14 of the rear part 5 of the rod after the latter has moved forwardly and compressed the spring 10 to the desired extent during the dividing stroke, and so that towards the termination of such stroke the two parts 5 and 8 are caused to operate as a solid thrust member.

Any suitable means may be provided for preventing the two parts separating on the rearward stroke, for example the spindle 7 of the forward part 8 may have a longitudinal flat or recess 15 formed thereon adapted to be engaged by a fixed limit pin 16 passing transversely through the rear part 5 of the rod so that when the parts 5 and 8 are separated to the desired maximum extent the transverse pin 16 comes into contact with the shouldered end 17 of the longitudinal flat 15 and prevents further extension of the composite rod.

Any suitable means may be provided for locking the parts 5 and 8 in their position of maximum extension and enabling the rod 4 with the parts in this position to function as a solid member, for example the spindle bore 6 in the rear part 5 may have a transverse bore 18 passing through it in a position adjacent the limit pin 16. This transverse bore 18 is adapted to receive a removable locking pin 19 the end of which may be forked and carry a pivoted tongue or latch 20 which is adapted to be moved into a longitudinal position when the locking pin 19 is to be removed, and into a transverse position in order to act as a cross stop to prevent accidental removal of the pin. The locking pin 19 may have a knurled or other manipulating head or handle 21 and between the head and the rear part 5 of the connection rod a compressing spring 22 is provided to hold the latch 20 up to its work and retain it securely in the latched position. A chain may be provided one end of which is secured to the locking pin while the other end may be anchored to a convenient part of the machine so that the locking pin 19 may not be lost.

When it is desired that the two-part connecting rod 4 should operate as a solid thrust member for dividing dough pieces for 2-lb. loaves, the locking pin 19 is placed in position when it backs up and serves as an abutment for the end of the spindle 7 of the forward portion 8 of the rod. In this position the spindle 7 is also locked by the limit pin 16 engaging the end 17 of the flat 15 on the spindle, preventing any relative movement of the parts 5 and 8 of the connecting rod on the rear stroke of the ram.

In order to set the machine for dividing dough pieces for 1-lb. loaves all that it is necessary to do is to make the appropriate adjustment of the ram stop or the like in the division box 23 for giving the 1-lb. pocket capacity and to remove the locking pin 19 from behind the spindle 7. By this last operation the parts 5 and 8 of the connecting rod 4 are freed and the rear part 5 is capable of sliding forwardly upon the forward part 8 against the resistant action of the dough and the resilience of the spring 10 around the spindle 7. In this case as the bell-crank lever 1 is oscillated to drive the ram 3 forwardly the rear part 5 of the connecting rod commences to slide on the forward part 8 of the rod. This sliding action continues until the front end 14 of the rear part abuts against the shoulder 13 on the forward enlargement and the two parts move together as one functioning as a solid rod. The sliding movement from the initial position until the rearward part meets the shoulder 13 serves after the manner of a controlled lost motion device, which is progressively and automatically absorbed according to the resistance of the dough in filling the 1-lb. chamber or chambers of the division box. The longitudinal extent of the lost motion movement is chosen to suit the shorter stroke which it is calculated is best suited for the treatment for the dough pieces for the 1-lb. loaves.

The initial rearward movement of the ram is accompanied by an extension of the two parts 5 and 8 under the influence of the dough suction and the housed spring 10. This extension will continue until the limit pin 16 meets the shoulder 17 on the spindle flat or recess 15 when the pin 16 will pick up the spindle and the forward portion 8 of the rod 4 will terminate its rearward stroke in the extended position together with the rear part 5 of the rod.

It will be observed that the housed spring 10 not only functions as a shock absorber or damper on the forward stroke but also serves to bring gradual pressure to bear upon the dough when the smaller weight pieces are being delivered. The spring 10 additionally functions to assist in returning the forward part 8 of the rod 4 to its normal or extended position on the rearward stroke of the ram.

I claim:

1. A dough dividing machine comprising a measuring compartment, reciprocating ram means feeding dough into said compartment, a pivotally mounted lever, a coupling rod connected to said ram, means comprising a lost motion transmission connecting the coupling rod and said lever, said transmission incorporating a spring buffer device, and a rotary cam for oscillating said lever through yielding means.

2. A dough dividing machine comprising a measuring compartment, reciprocating ram means feeding dough into said compartment, pivotally mounted lever means, coupling means between said lever and ram, said coupling means incorporating a lost motion transmission and a buffer device, and cam means for oscillating the lever means for reciprocating the ram.

3. A dough dividing machine comprising a measuring compartment, a reciprocating ram feeding dough into said compartment, a pivoted lever, cam means for oscillating said lever, a two-part coupling rod connecting said lever to said ram, a lost motion connection between the two parts of said coupling rod, and spring buffer means between the parts of said coupling rod, and means for rendering the lost motion means inoperative so that the coupling rod operates as a solid rod, the arrangement being such that the lost motion device functions to impart a shorter cushioned stroke to the ram, when dividing the lesser weights of dough for which it is designed, while when dividing larger weights of dough the lost motion device is rendered inoperative and the coupling rod operates as a solid rod.

4. A dough dividing machine comprising a measuring compartment, a reciprocating ram feeding dough into said compartment, a pivoted cam operated lever, a coupling rod connecting the lever to the ram, said coupling rod being formed in two parts telescoping one within the other, a buffer spring located between said parts, the inner part having a slot, the outer part having a pin engaging the slot and forming therewith a lost motion connection, said outer part having a transverse aperture for receiving a displaceable locking pin to engage the inner part of the rod when one end of said slot engages said pin to render the lost motion coupling inoperative when the coupling rod is to operate as a solid rod.

AUSTIN RICHARD PALMER.